(No Model.)

J. HOWELL.
TWO WHEELED VEHICLE.

2 Sheets—Sheet 1.

No. 262,897.

Patented Aug. 15, 1882.

Witnesses:
H. A. Low
J. S. Barker

Inventor:
Jacob Howell
by Doubleday & Bliss
attys (No Model.)  J. HOWELL.  2 Sheets—Sheet 2.

TWO WHEELED VEHICLE.

No. 262,897.  Patented Aug. 15, 1882.

Witnesses:
H. A. Low
J. S. Barker

Inventor:
Jacob Howell
by Doubleday & Bliss
attys.

UNITED STATES PATENT OFFICE.

JACOB HOWELL, OF JACKSON, MICHIGAN, ASSIGNOR OF ONE-HALF TO A. N. HOVEY, OF SAME PLACE.

TWO-WHEELED VEHICLE.

SPECIFICATION forming part of Letters Patent No. 262,897, dated August 15, 1882.

Application filed May 26, 1882. (No model.)

*To all whom it may concern:*

Be it known that I, JACOB HOWELL, a citizen of the United States, residing at Jackson, in the county of Jackson and State of Michigan, have invented certain new and useful Improvements in Running-Gear for Two-Wheeled Vehicles, of which the following is a specification, reference being had therein to the accompanying drawings.

Figure 1:
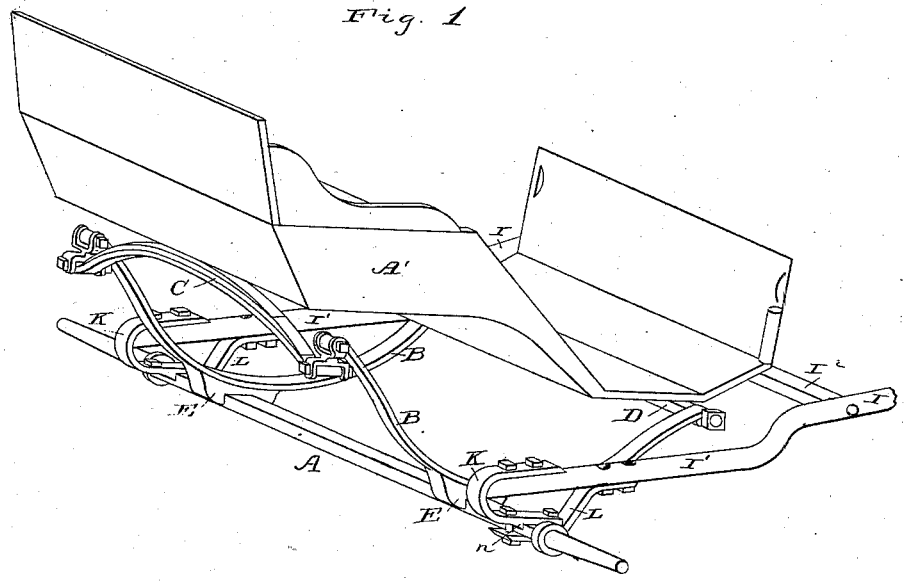
Figure 3:
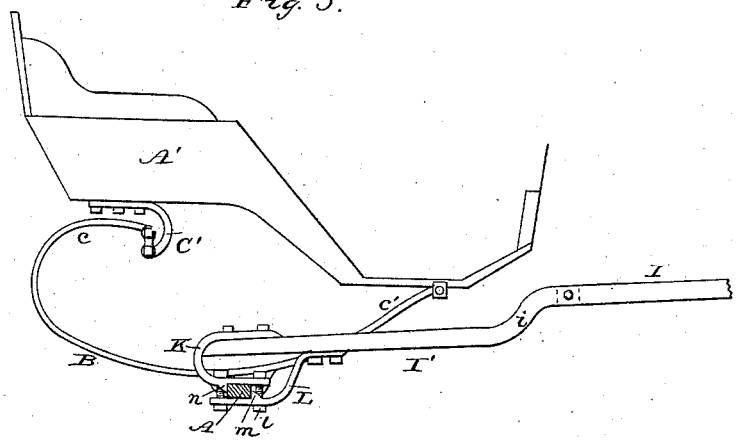
Figure 2:
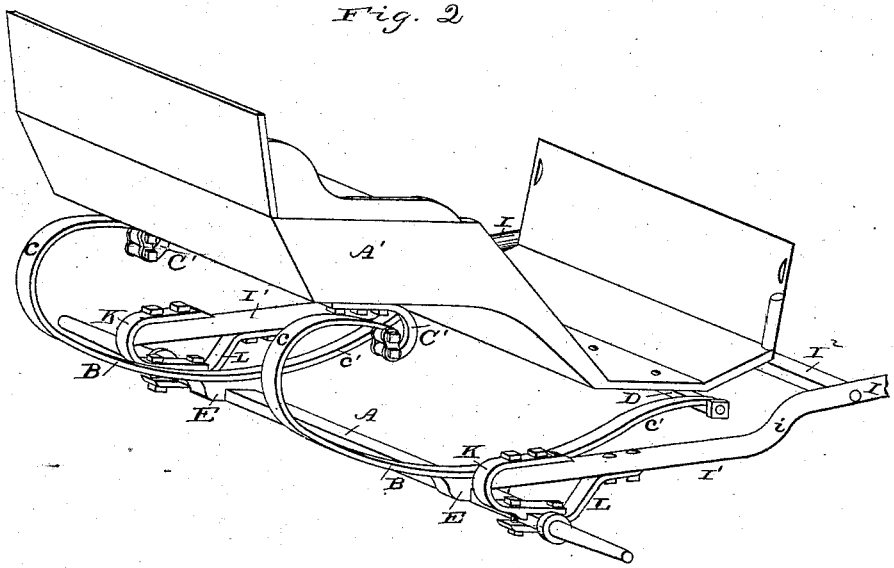

Figure 1 is a perspective of a vehicle embodying my improvements. Fig. 2 is a perspective view of a slightly-different style of running-gear. Fig. 3 is a side elevation of that shown in Fig. 2.

In the drawings, A represents the axle, upon which is mounted the gear, and to which the shafts or thills are attached.

A' shows a body supported upon the axle by running-gear or supporting devices, which hold the body entirely independent of the draft-frame. This running-gear may be either of the form shown in Fig. 1 or of that shown in Figs. 2 and 3.

In Fig. 1 the side springs employed are represented by B B, they being similar to the side springs in vehicles as now constructed. The rear ends of these springs are connected to a cross-spring, C, by means of any suitable coupling devices. The body A' is at its rear end attached to this cross-spring C, and at its front end is joined to the side springs, B B, by means of a cross-bar, D.

Instead of the cross-spring C (shown in Fig. 1) and the side springs, B, of the common form, use may be made of the springs shown in Figs. 2 and 3, these being of the form ordinarily designated as "C-springs." They have an upwardly-curved part, c, behind the axle, and a part, c', in front of the axle curved upwardly and forwardly. The rear forwardly-extended ends of the side springs in this construction are joined to the body by means of curved bracket-pieces C'.

Much jarring or rattling is caused when the thills or shafts are united to vehicles of this sort in the ordinary manner—that is to say, when they are connected directly to the front portion of the body, as has been customary. I avoid these objections and provide a much steadier draft-connection, whereby the vehicle is drawn more smoothly and pleasantly than when use is made of the devices last described. I attach the draft device directly to the axles between the wheels and the side springs.

The connecting devices consist of a metallic arm or bar, K, the forward end of which is bolted to the under side of the rear end of the thill. At its rear end it is bent downward and forward, said end being preferably somewhat flattened to form a plate, whereby it can be clamped against the upper side of the axle.

To form a support for the clamping devices below the axle, and to also provide a brace between the thill and the axle, I combine with the connecting-arm K a brace, L, the forward end of which is bolted to the thill or to the forward end of the part K. It is bent downward, so as to have its lower end lie below the axle, which end is clamped securely against the axle by means of bolts $l$ passing through it and through the rear end of the part K. At $m$ a shoulder is formed, which bears against the front side of the axle to receive the backward thrust of the arm L and relieve the clamping-bolt of unnecessary strain, there being a corresponding shoulder, $n$, formed on the bar K to engage with the opposite side of the axle to receive the forward pulling-strain. The clamping-bolts are so arranged that there shall be one or more of them on each side of the axle, so as to distribute the strain and insure a proper engagement. When the draft devices are attached by this means to the axle the body is relieved of the jarring and rattling incident to the use of the connections heretofore employed; and the movements of the vehicle are much pleasanter and more satisfactory than when the draft devices are connected at all with the body.

The body, it will be seen, is entirely independent of the draft-connection, and can rise and fall and sway to a limited extent without being interfered with thereby.

The thills I I' are bent at $i$, at or just in front of the forward end of the body, so as to throw the rear portion, I', down far enough to avoid its interfering with getting into or out of the vehicle, and so as to avoid all possibility of the body's striking or resting upon the thills under any ordinary circumstances. The cross-bar I, which joins the thills, is far enough forward to avoid being struck by the body in any of its movements.

I am aware that vehicles of the class known as "sulkies" have been heretofore made with the draft devices connected to the axle, and also that springs have been employed with two-wheeled vehicles arranged in such manner as to be fastened at one point to the axle and at another point directly above to the body; but the vehicle which I have shown and described differs radically from those referred to. In "sulkies" specifically so-called it has been customary to connect the draft devices not only with the axle but also with the body or seat portion. This connection I avoid entirely. A body of the shape and conformation which I have shown cannot be properly supported upon springs of the character which have been heretofore used in two-wheeled vehicles. A body of this character and mounted in the manner in which I mount mine to be properly supported must be secured by means of side springs, the ends of which are fastened beneath the front end and the rear end, respectively, to the body.

I am aware that in the construction of four-wheeled vehicles use has been made of "platform-springs"—that is to say, a cross-spring under the rear end of the vehicle and side springs connected therewith, the latter resting upon the rear axle—and I do not claim such devices as my invention. I am not aware that it has been customary to construct two-wheeled vehicles with the draft devices attached entirely independently of the body part and with a rear cross-spring and side springs, situated substantially as shown, to give a spring-support all round the body, the latter being held thereon.

It will be seen that the side springs in both the constructions which I have shown are at their rear ends connected to the rear end or part of the body. In Fig. 1 they are connected by an interposed spring. In the construction shown in Figs. 2 and 3 they are connected by means of rigid hangers or brackets. So far as certain parts of the invention are concerned, and so long as the rear ends of the springs are arranged to support the rear end or part of the body, it is immaterial whether they be joined thereto by a spring or by a rigid connection.

What I claim is—

1. In a two-wheeled vehicle of the character described, the combination of the axle, the draft devices connected directly to the axle, the side springs, B B, supported upon the axles, and the body A, having the front ends of said side springs connected to it beneath its front end, and the rear ends of said side springs connected to it beneath its rear end, whereby the body is supported upon the single axle entirely independently of the draft devices, substantially as set forth.

2. In a running-gear for gigs and chaises, the combination of the axle, the cross-spring C below the rear end of the body, the side springs, D D, supported upon the axle and attached at their front ends to the forward part of the body, and at their rear ends to said cross-springs C, and the draft devices connected to the axle directly independently of the body, substantially as set forth.

3. The combination of the axle, the thills secured to the axle and arranged independently of the body, the connecting-bar K, provided with a shoulder, n, to engage with the upper rear side of the axle, the brace or bar L, formed separately from the bar K, and provided with the shoulder m, to engage with the lower front side of the axle, and the clamping devices for securing said separate braces or bars K and L together, substantially as set forth.

4. In a running-gear for gigs and chaises, the combination, with the axle and the thills, of the connecting-bar K, having its forward end bolted to the thill, and its end bent downwardly and forward to rest upon the axle, the clamping-plate below the axle, and a brace to receive the rear thrust of the thills, substantially as set forth.

5. In a running-gear for gigs and chaises, the combination, with the axle and the thill, of the connecting-bar K, having its forward end bolted to the thill and its rear end clamped to the axle, and the brace L, secured to the thill at the forward end, and clamped at its rear end to the bar K by bolts on both sides of the axle, substantially as set forth.

6. In a two-wheeled vehicle, the combination, with the body, and the springs supported entirely upon the axle, of the thills I I', connected directly to the axle and bent as at i, substantially as set forth.

In testimony whereof I affix my signature in presence of two witnesses.

JACOB HOWELL.

Witnesses:
N. H. KING,
E. E. PORTER.